United States Patent [19]

van de Löcht

[11] Patent Number: 4,512,109

[45] Date of Patent: Apr. 23, 1985

[54] ROLLING GEAR APPARATUS FOR AN INVOLUTE TOOTH GEAR CUTTING MACHINE

[75] Inventor: Heinrich van de Löcht, Malsch, Fed. Rep. of Germany

[73] Assignee: BHS-Dr. Ing Hofler, Maschinenbau GmbH, Ettlingen-Oberweier, Fed. Rep. of Germany

[21] Appl. No.: 432,922

[22] PCT Filed: Jul. 5, 1982

[86] PCT No.: PCT/DE82/00138

§ 371 Date: Sep. 29, 1982

§ 102(e) Date: Sep. 29, 1982

[30] Foreign Application Priority Data

Jul. 7, 1981 [DE] Fed. Rep. of Germany ....... 3126768

[51] Int. Cl.³ .............................................. B24B 3/00
[52] U.S. Cl. ............................................... 51/123 G
[58] Field of Search ..................................... 51/123 G

[56] References Cited

U.S. PATENT DOCUMENTS

3,584,424  6/1971  Cleff ................................. 51/123 G
3,624,972 12/1971  Graf .................................. 51/123 G
3,877,150  4/1975  Hofler ............................... 51/123 G
4,090,330  5/1978  Mischler ........................... 51/123 G

*Primary Examiner*—James L. Jones, Jr.
*Attorney, Agent, or Firm*—Silverman, Cass & Singer, Ltd.

[57] ABSTRACT

A rolling gear apparatus for an involute tooth gear cutting machine that rests on an engine bed of the machine. A primary carriage is longitudinally movable in both directions on the engine bed and carries at its top a secondary carriage that is guided in longitudinal movement in both directions. A crank element is connected to the secondary carriage and is glidingly movable in a guideway that is angularly adjustable relative to the engine bed. A roll-circle member is carried by the primary carriage and is connected to the secondary carriage through a band drive. The movement path II of the secondary carriage is at an oblique angle to the movement path I of the primary carriage to provide improved selectivity in adjusting the base-circle diameter of a toothed-wheel gear blank connected to the roll-circle member.

12 Claims, 13 Drawing Figures

ROLLING GEAR APPARATUS FOR AN INVOLUTE TOOTH GEAR CUTTING MACHINE

BACKGROUND OF THE INVENTION

The invention relates to rolling gear apparatus for use in a gear cutting machine forming involute teeth from toothed wheel gear blanks.

Apparatus of the above kind (DE-PS 2,009,593) are already known that are adjustable for different base circle diameters of the involute. To produce the necessary rolling movement of the gear blank, two carriages are provided. A primary carriage moves back and forth on top of a column while a secondary carriage moves back and forth in a direction transverse to the first carriage and is adjustable on its base. The two carriages alternatively are driven by means of a spindle. The primary carriage provides the translation portion of the rolling movement to the apparatus system. The second secondary carriage operates with a sliding block which glides in a guideway set on an angle around a center of rotation to produce the rotational portion of the rolling movement. The sliding block is connected with the secondary carriage and can be adjusted back and forth in the guideway. The working part that is to be operated on, that is machined, will be turned around an arched path that is determined in each case by the angle of the guideway, the working part being turned by a roll-circle. The roll-circle is connected with the secondary carriage, while the guideway that is set at an angle is arranged on an engine bed.

With this known type of apparatus, the guideway of the secondary carriage is precisely at a right angle to the movement path of the primary carriage. The angle position of the guideway is set at a mathematically predetermined value to select the different base circle diameters. Thus, the roll motion of the working-part to be operated on, which is necessary for an involute-tooth forming system, is assured. The disadvantage with this type of apparatus is the relatively low selectivity of setting the desired base circle diameter in any case. Thus, for example, to change the base circle diameter of the roll-circle arch, many values from zero (0) degrees to ninety (90) degrees are required.

The task of the invention presented is to develop the rolling gear apparatus of the kind mentioned so that an increased selectivity is made possible when setting the appropriate base circle diameter. This task is accomplished in accordance with the invention in that the movement path of the secondary carriage runs at an oblique angle or angle to the movement path of the primary carriage. Thereby, in both a simple manner and as a result of the slanted position of the movement path of the secondary carriage, a significantly improved selectivity of setting the selected base circle is accomplished.

Optimal conditions are then present in a further embodiment of the invention when the movement path of the secondary carriage runs at a 45° angle to the movement path of the primary carriage; thus, the selectivity is increased by a factor of the square root of $2(\sqrt{2})$.

According to a further embodiment of the invention, the secondary carriage can be connected with the drive means of the rolling gear apparatus, the working-part table can be connected with the drive means of the rolling gear apparatus, or the primary carriage can be connected with the drive means of the rolling gear apparatus.

Further, it is possible that with two drives either the primary and secondary carriages can be driven or the primary carriage and the working-part table can be driven.

According to another feature of the invention, the primary and secondary carriages are each provided with a longitudinal movement indicator. Alternatively, the primary carriage is provided with longitudinal movement indicator and the working-part table is provided with an angular movement indicator. Thus, in an advantageous way, as a result of the effect of the individual indicators and the angularly adjustable guideway of a crank element, an exact setting of the base diameter is obtained.

According to another feature of the invention, the secondary carriage is provided with an element for obtaining a cutting advance. This element can be adjusted and can be set between two stops whereby the entire unit is adjustable and can be set to carry out the separation between two stops. Further, the working-part table and roll-circle are equiped with a coupling. Both stops can be built to be adjustable whereby, according to another feature of the invention, the coupling in each case consists of a diaphram ring impacted upon by a medium, the diaphram ring being in operative connection with a lamella. Thus, a simple way, the possibility exits for providing a cutting advance, compensation for play as well as for carrying out separation stepping free from play.

SUMMARY OF THE INVENTION

A back and forth movable primary carriage rests on an engine bed. At the top of the primary carriage, a secondary carriage is guided in back-and-forth movement. A crank element is provided in a guideway that may be adjusted to a desired angle and that is connected to the engine bed. The crank element is connected with the secondary carriage. The secondary carriage drives a roll-circle through a band drive, and the roll-circle is connected with a working-part table and with at least one drive means.

BRIEF DESCRIPTION OF THE DRAWING

The invention will be described in connection with drawing figures illustrating different features of the invention, in which.

DESCRIPTION OF THE PREFERRED EMBODIMENT

Figure 1:
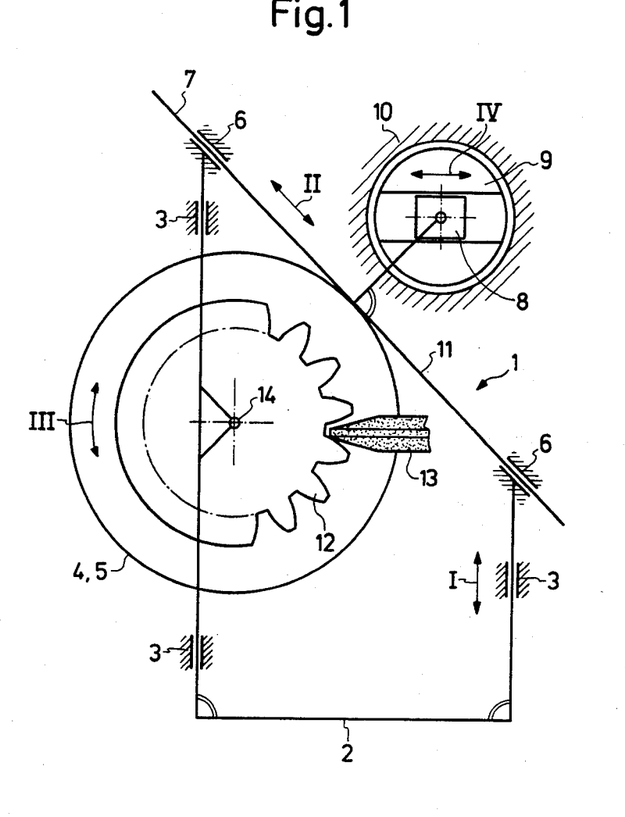
FIG. 1 is a diagram of the fundamental construction of a rolling gear apparatus of the invention.

The rolling gear apparatus generally is indicated in FIG. 1 by the reference character 1. This apparatus consists essentially of a primary carriage 2 and a secondary carriage 7. The carriage 2 is movable along a longitudinal movement path indicated by the movement direction arrow I in guideways 3 of the engine bed. Carriage 2 carries guideways 6 in which the secondary carriage 7 is moved in longitudinal directions along a movement path indicated by the movement direction arrow II. Movement direction II is formed to be at an oblique angle or angle to movement path I.

Secondary carriage 7 is connected with a crank element 8 that is movable in a guideway 9. Guideway 9 is arranged in the engine bed and may be set at adjustable angles. Movement of the secondary carriage 7 along its path in the directions II moves the crank element 8 inside the guideway 9 in longitudinal directions indicated by the movement direction arrow 4.

Secondary carriage 7 includes a band-drive 11 that operates in conjunction with a roll-circle member IV. Roll-circle member 4 is carried on primary carriage 2 and rotates around its axis 14. Co-axial with axis 14 is a working-part table 5 coupled to the roll-circle member 4 and on which a toothed-wheel gear blank 12 to be operated on is arranged. A grinding disk 13 is provided that operates on the blank 12 and provides involute surface teeth on this gear blank 12.

Through the joint effect of the movements of the members along movement paths I, II and IV through a band-drive 11 a turning of the roll-circle member 4 results in an angular movement indicated by movement direction arrow III. Preferably the movement path II of the secondary carriage 7 is arranged at a 45° angle to the movement path I of the primary carriage.

The effect of this apparatus is as follows:

When the primary carriage 2 is moved, a relative motion results between the crank element 8 arranged on the secondary carriage and the guideway 9. Hereby the crank element 8 and with it the secondary carriage 7 receives a movement along the movement path IV that depends on the angular position of the guideway 9. The movement is transferred to the roll-circle member 4 via the secondary carriage 7 as well as the band-drive 11, which are arranged in guideways 6. Thus, a turning of the roll-circle member 4 and with it also the working-part table 5 carrying the toothed-wheel gear blank 12 results. Through this rolling movement of the working-part table 5 against the straight flank of the grinding disk 13, an exact involute gear-toothed surface results on blank 12.

The size of the base-circle diameter of the involute is thereby determined through the adjustable angle position of the guideway 9 in the engine bed 10.

Figure 2:
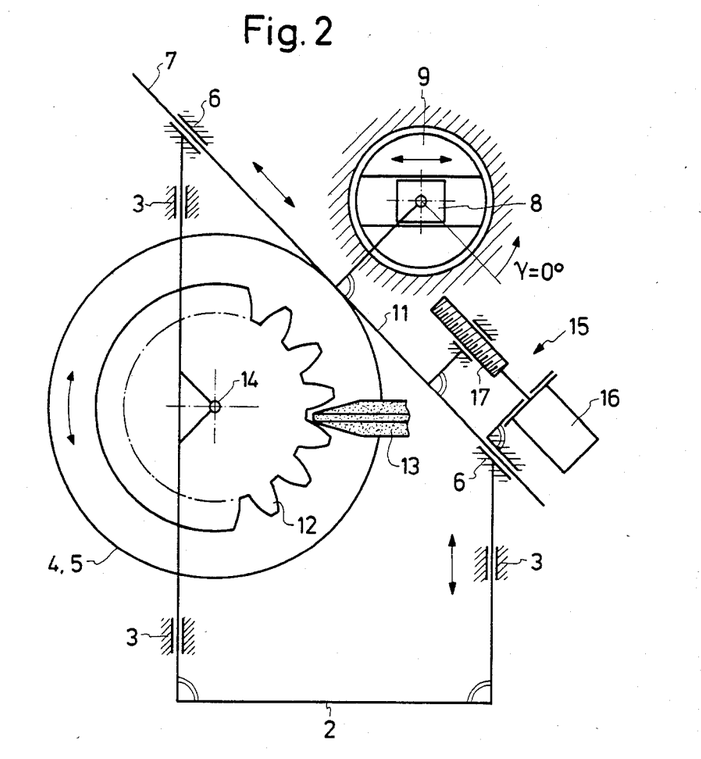
FIG. 2 is a diagram of the rolling gear apparatus of the invention with the secondary carriage being driven.

In FIG. 2 the drive means of the rolling gear apparatus is illustrated. Secondary carriage 7 is equipped with a drive 15 consisting of a motor 16 and a gear spindle 17. With this drive means, driving of the apparatus proceeds via the secondary carriage 7 by virtue of its operative connection with the carriage 2 through slanted guideways 6, as well as through the crank element 8 in the guideway 9 with band-drive 11 transferring this movement in true form through roll-circle member 4 to the toothed wheel blank 12. With this kind of drive arrangement the angle delta $\gamma$ to which the guideway 9 may be adjusted, is between 0° and 67.5°.

Figure 3:
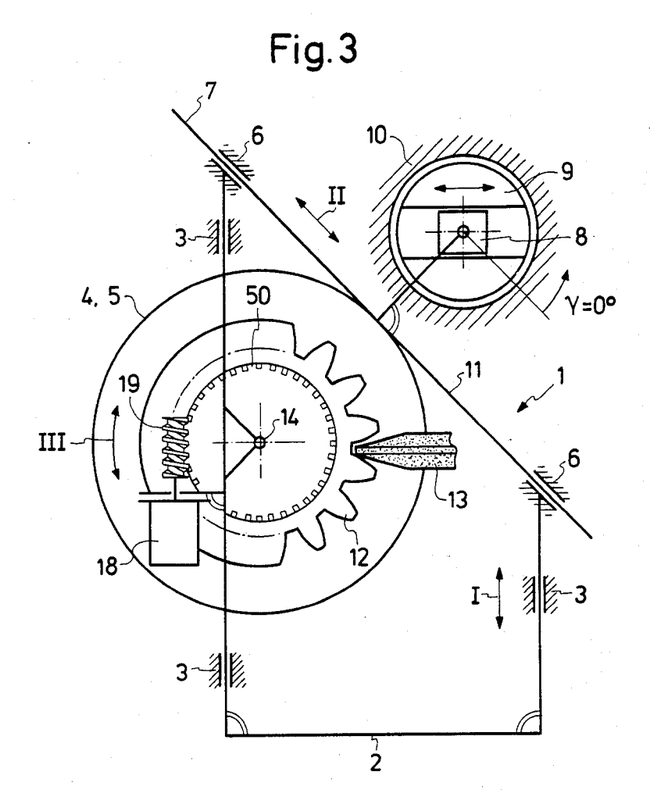
FIG. 3 is a diagram of the rolling gear apparatus of the invention with the working-part table being driven.

In FIG. 3 drive of the apparatus is provided by a motor 18 and a worm 19 operating together with a worm gear 50 that is located along the axis 14 of the roll-circle member 4 and the working-part table 5. Here, also, the angle delta $\gamma$ of the guideway 9 can be adjusted between 0° and 67.5°, i.e., the setting of the guideway 9 relative to the engine bed 10 can be in this range.

Figure 4:
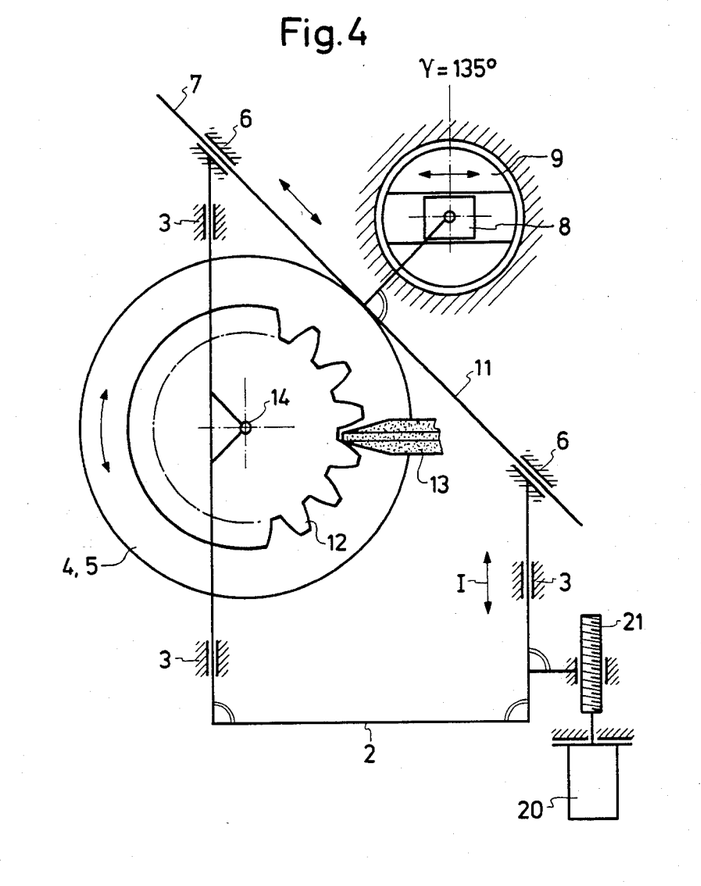
FIG. 4 is a diagram of the rolling gear apparatus of the invention with the primary carriage being driven.

In FIG. 4 movement of carriage 2 is provided by a motor 20 and a worm gear spindle 21. Here the angle delta $\gamma$ to which the guideway 9 is adjusted is between 67.5° and 135°.

Figure 5:
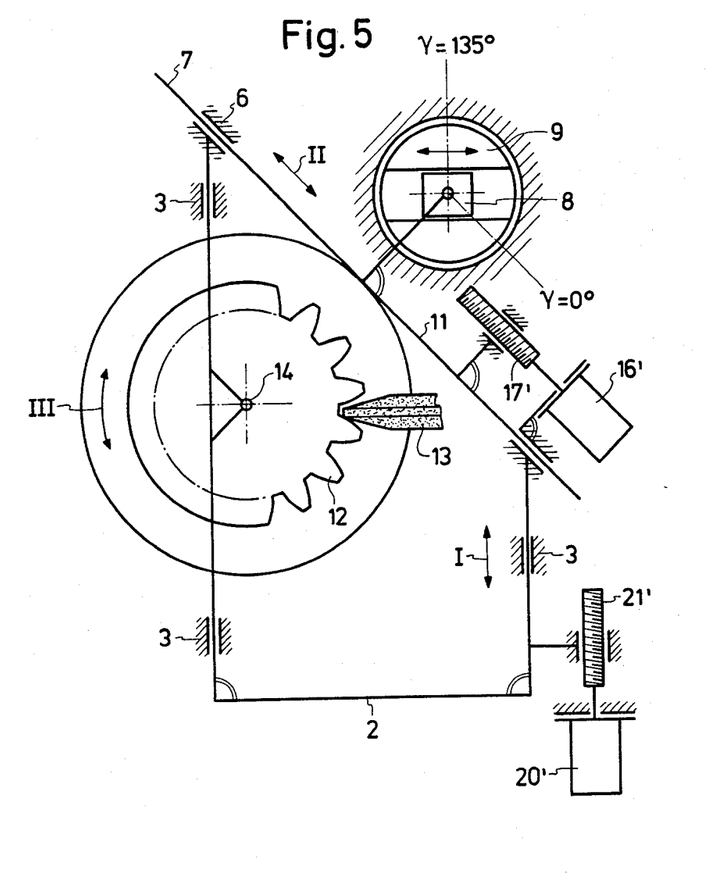
FIG. 5 is a diagram of the rolling gear apparatus of the invention with the primary and secondary carriages being driven.

In FIG. 5 two drive means are provided. These are means 16' and 17' for the secondary carriage 7 causing its movement along movement path II and drive means 20' and 21' for moving the primary carriage 2 along its movement path I. As the base-circle diameter of the involute increases the delta $\gamma$ reaches a value at which the self-locking forces applied to the crank element 8 no longer allow rotation of the gear blank 12 via the secondary carriage 7 and the band-drive 11. With diameter conditions where the angle delta $\gamma$ reaches a range in the guideways at which the forces are too great, the means for causing the movement must be changed. In the range of the angle delta $\gamma$ equal 0° to 67.5° degrees, the secondary carriage drive means 16' and 17' alone are effective and carriage drive means 20' and 21' are disengaged. If a value of the angle delta $\gamma$ above about 67.5° becomes necessary for the base-circle diameter then the secondary carriage drive means 16' and 17' are disengaged and the primary carriage drive means of motor 20' and worm gear spindle 21' are engaged. This occurs when the value of the angle delta $\gamma$ is between 67.5° and 135°. The drive means of the secondary carriage 7 are applied then at an angle delta $\gamma$ in the range of 0° to 67.5° and the drive means of the primary carriage 2 are applied at an angle delta $\gamma$ in the range of 67.5° to 135°. For these ranges then the drive means 16' and 17' and drive means 20' and 21', respectively, are alternatively coupled to the apparatus.

Figure 6:
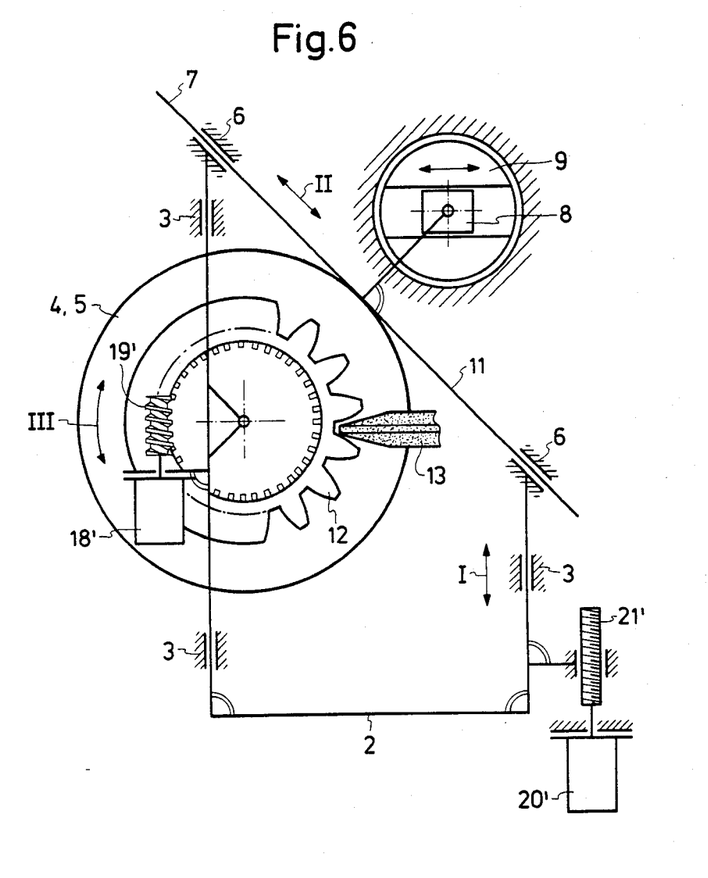
FIG. 6 is a diagram of the rolling gear apparatus of the invention with the primary carriage and working-part table being driven.

In FIG. 6, working-part table drive means 18' and 19' for moving working-part table 5 are provided together with the drive means 20' and 21' for the primary carriage 2. If the angle delta $\gamma$ is between 0° and 67.5° then the motor 18' and worm gear spindle 19' effect the drive of the rolling gear apparatus. If the angle delta $\gamma$ is increased with the changed base-circle diameter to a range between 67.5° and 135°, then the working drive means 18' and 19' are disengaged and instead the primary carriage drive means 20' and 21' are brought into operative connection with carriage 2.

Figure 7:
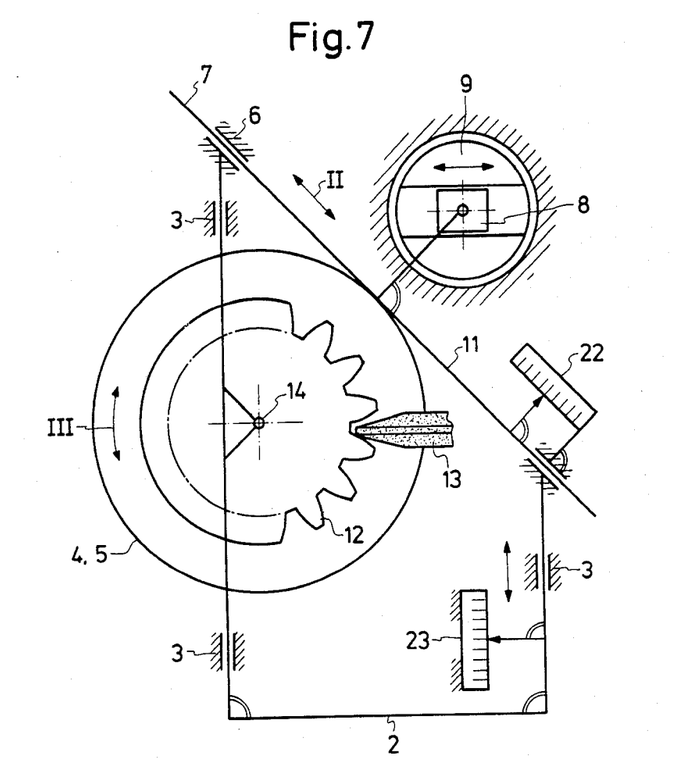
FIG. 7 is a diagram of the longitudinal movement indicators mounted on the primary and secondary carriages.

As explained in the preceeding text, the step in selecting the size of the base circle diameter for producing the appropriate involute, is the angular adjustment of the guideway 9 that guides the crank element 8. This angular adjustment is accurately determined as is illustrated in FIG. 7 by providing the secondary carriage 7 with a longitudinal movement indicator 22 and providing the primary carriage 2 with a longitudinal movement indicator 23. The base circle diameter is determined from the path components of the translational path of primary carriage 2 and the translation path of the secondary carriage 7. The extent of the translation of both carriages along their respective paths is determined and operated on by a central processor such as a computer which is not shown here to determine the roll-circle diameter of the base circle diameter. Thereafter, corrections are made at the setting of the crank guideway 9 by way of both longitudinal movement indicators 22 and 23 until the actually desired and indicated base circle diameter corresponds with the base circle diameter of the working part to be operated on.

Figure 8:
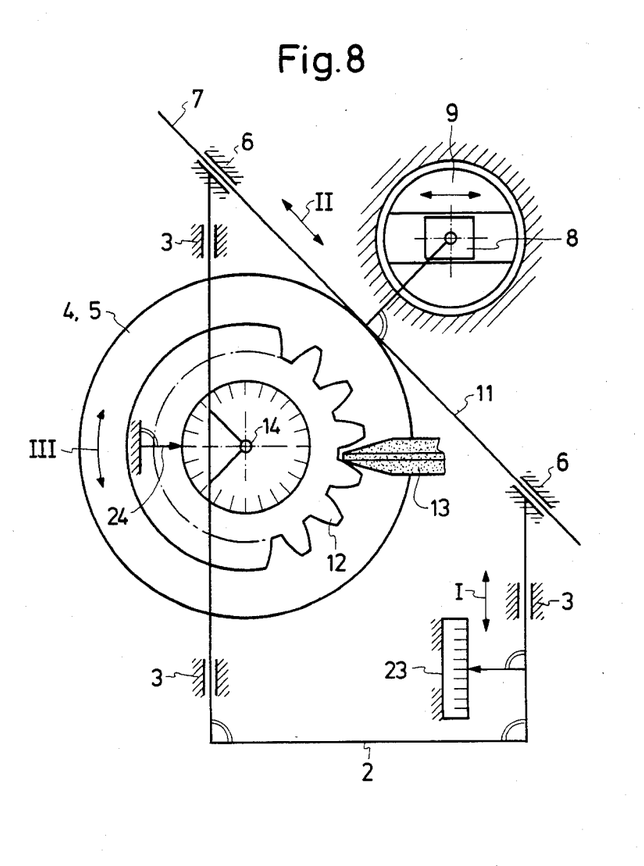
FIG. 8 is a diagram of the rolling gear apparatus of the invention with an angle indicator on the working-part table and a longitudinal movement indicator on the primary carriage.

In FIG. 8, an angular movement indicator 24 is provided on working-part table 5 while a longitudinal movement indicator 23 is provided on primary carriage 2. Here again, there are two movements namely the translation of the primary carriage 2 and the rotation of the working-part table 5. Again, via mathematical operations, the desired values for obtaining a roll-circle diameter corresponding to the desired base-circle diameter are effected, and corrections concerning the setting of guideway 9 are made until the desired base circle diameter is obtained.

Figure 9:
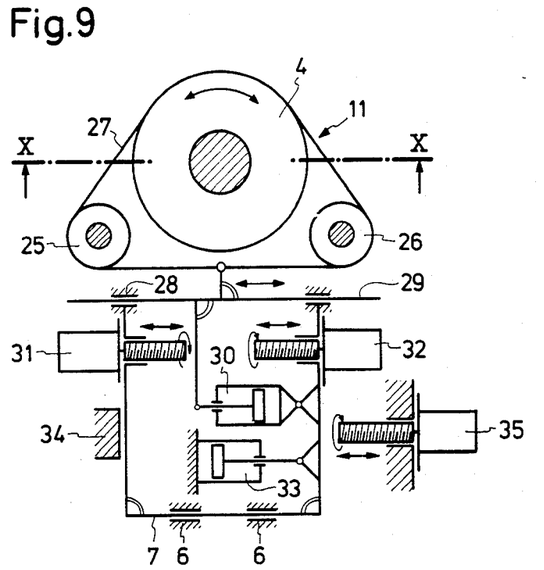
FIG. 9 is a diagram of a secondary carriage including elements providing for cutting advance, compensation for play and for carrying out the separation free from play.

In FIG. 9, another embodiment of the secondary carriage 7 is illustrated. In this embodiment, secondary carriage 7 is connected to a tension band 27 by an element 29. Tension band 27 is looped over guide rollers 25 and 26 and drives the roll-circle member 4. These elements form the band drive 11. Element 29 is movable in guideways 28 of the secondary carriage 7 and drive means 30 are provided connected to element 29 so that through actuation of the drive means 30 either to the left or to the right, a cutting advance occurs. This cutting advance is an operation, respectively, on the left or right flank of the toothed wheel gear blank 12. At this time, the roll-circle member 4 is disengaged from the working-part table 5.

When the roll-circle member 4 is disengaged from the table 5, the entire unit consisting of secondary carriage 7 and element 29, for example, can proceed from partial stop member 34 to partial stop member 35 by way of drive means 33. Then, the roll-circle member 4 and working-part table 5 are again coupled and the unit consisting of the secondary carriage 7 and element 29 are driven back to stop member 34 so that the rotation of table 5 is effected.

Thus, in a simple way, through the joint effect of various elements of the secondary carriage and band-drive, a separation proceeds, that is to say that the toothed-wheel gear blank 12 will be turned a fractional step.

Figure 10:
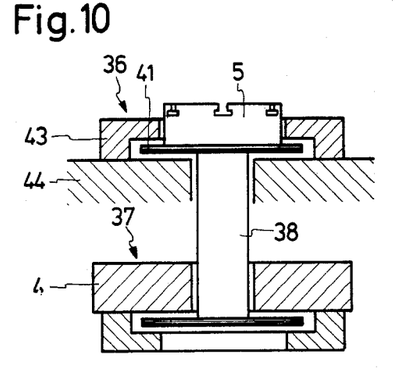
FIG. 10 is a sectional view taken along the line X—X of FIG. 9 and in the direction shown by the arrows.
Figure 11:
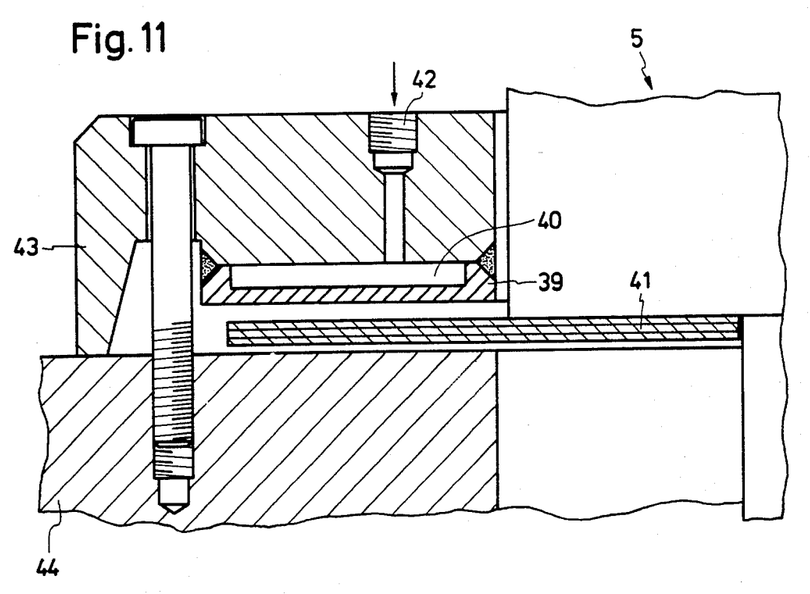
FIG. 11 is a partial sectional view of the coupling of the working-part table of FIG. 10.
Figure 12:
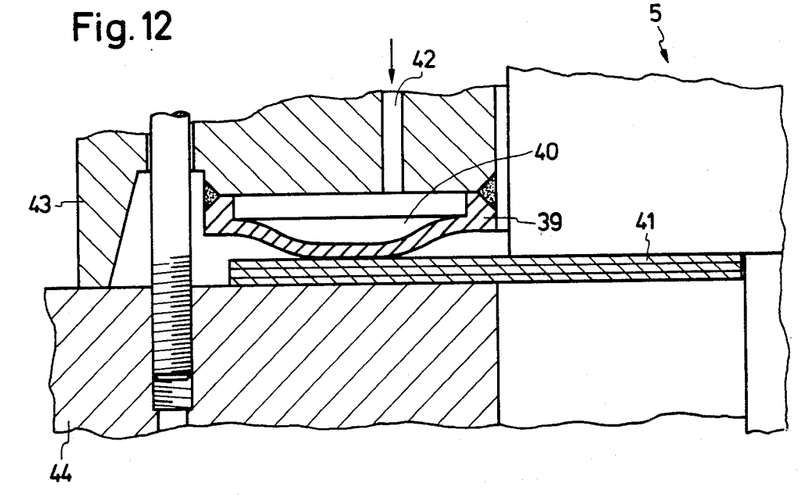
FIG. 12 is a partial sectional view of the coupling of the working-part table of FIG. 10.
Figure 13:
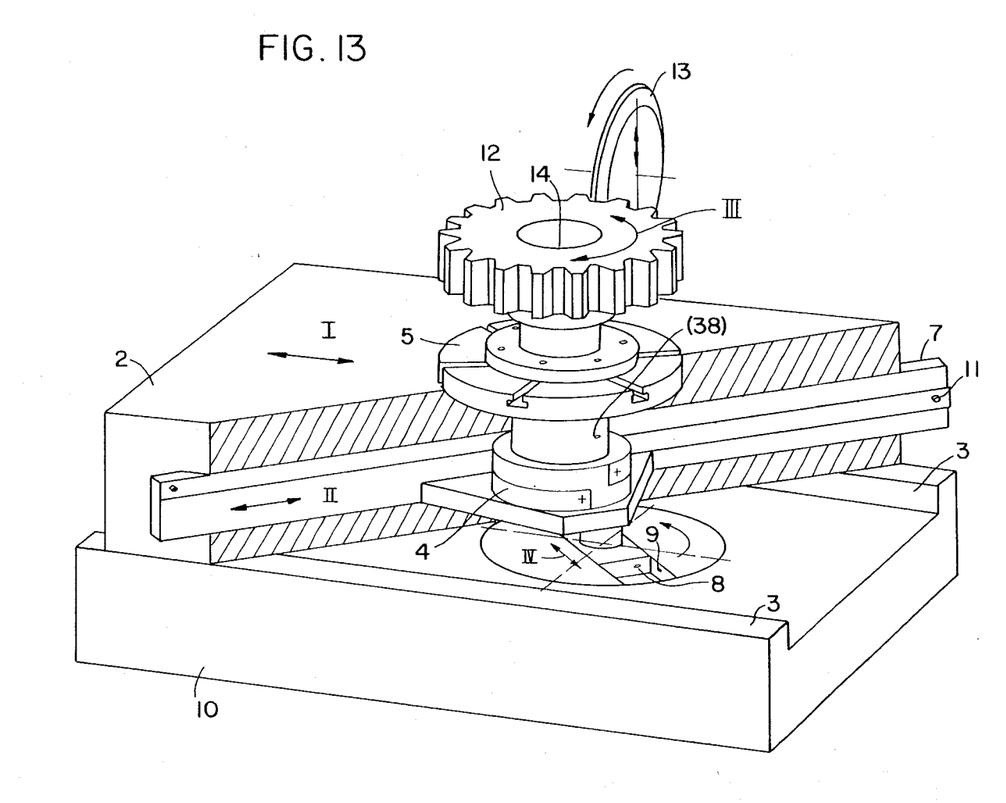
FIG. 13 is a perspective view of an embodiment of the rolling gear apparatus generally corresponding to the schematic illustration of FIG. 1.

The coupling between the roll-circle member 4 and working-part table 5 is shown in detail in FIGS. 10, 11, and 12. A drive spindle 38 is connected between the working-part table 5 and roll-circle member 4. Additionally, a housing top 43 and a housing bottom 44 are provided. This is shown in greater detail in FIGS. 11 and 12. On the housing top 43 a work chamber 40 is provided that is closed off by a flexible diaphragm ring 39. Below the diphram ring is a lamella 41 that is connected with the spindle 38 for driving the working-part table 5 and the roll-circle member 4. A compressed oil line 42 is provided through the housing top 33 and opens into the working chamber 40.

When compressed oil is fed into the working chamber 40 through the compressed oil line 42, the diaphram ring 39 flexes or bows and presses against the lamella 41 engaging lamella 41 tightly between the diaphram ring 39 and the housing bottom 44. This causes the disengagement of the roll-circle member 4 from the working-part table 5 in a simple way. When the oil pressure in the oil line subsides, the diaphram ring 39 returns to its original position illustrated in FIG. 11, the coupling is disengaged and the roll-circle member 4 is once again engaged with working-part table 5.

In total, the invention results in a rolling gear apparatus that simply effects an increase in selectivity in setting the base-circle diameter of involute toothed gears. Because of the special formation of the secondary carriage, separation or stepping between teeth proceeds in a simple fashion in which the cutting advance, compensation for play and operations of the right and left flank of gear teeth is effected.

I claim:

1. A rolling-gear apparatus for an involute-tooth gear cutting machine, the machine including an engine bed, comprising:
   a primary carriage longitudinally movable in both directions along a movable path I in a first guideway formed on the engine bed;
   a secondary carriage longitudinally movable in both directions along a movement path II in a second guideway formed on the primary carriage, the movement path II being at an oblique angle relative to the path I;
   a crank element connected to the secondary carriage and glidingly movable in a third guideway, the third guideway being angularly adjustable relative to the engine bed;
   a roll-circle member carried by the primary carriage and connected to a working-part table for co-rotation therewith, the roll-circle member being rotatably connected to the secondary carriage through a band-drive; and
   drive means connected to at least one of the primary carriage, the secondary carriage and the working-part table for driving the same in their respective translational and rotational movements.

2. The apparatus of claim 1 in which the angle of the movement path II of the secondary carriage is an angle of 45° to the movement path I of the primary carriage.

3. The apparatus according to claims 1 or 2 in which the drive means are connected with the secondary carriage.

4. The apparatus according to claims 1 or 2 in which the drive means are connected to the working-part table.

5. The apparatus according to claims 1 or 2 in which the drive means are connected with the primary carriage.

6. The apparatus according to claims 1 or 2 in which the drive means alternatively drive the primary carriage and the secondary carriage.

7. The apparatus according to claims 1 or 2 in which the drive means alternatively drive the primary carriage and the working-part table.

8. The apparatus according to claim 1 in which the primary carriage and the secondary carriage are provided with longitudinal movement indicators.

9. The apparatus according to claim 1 in which the primary carriage is provided with a longitudinal movement indicator and the working-part table is provided with an angular movement indicator.

10. The apparatus according to claim 1 in which the secondary carriage is connected to an element that is movable and that can be fixed in position between two first stops to provide a cutting advance of the working-part table, the secondary carriage and element are movable and can be fixed between two secondary stops to provide stepping of the working-part table, and the working-part table and roll-circle member being moved together with a coupling.

11. The apparatus according to claim 10 in which the first stops and secondary stops are adjustable.

12. The apparatus according to claim 10 in which said roll circle member and said working-part table are coupled for co-rotation on a spindle carrying said coupling wherein the coupling includes means for disengagement of said roll circle member from co-rotation with said table.

* * * * *